March 4, 1952 | S. J. WAYO ET AL | 2,588,063
SEPARATION OF PROPENE AND PROPANE BY EXTRACTIVE DISTILLATION
Filed Sept. 30, 1947
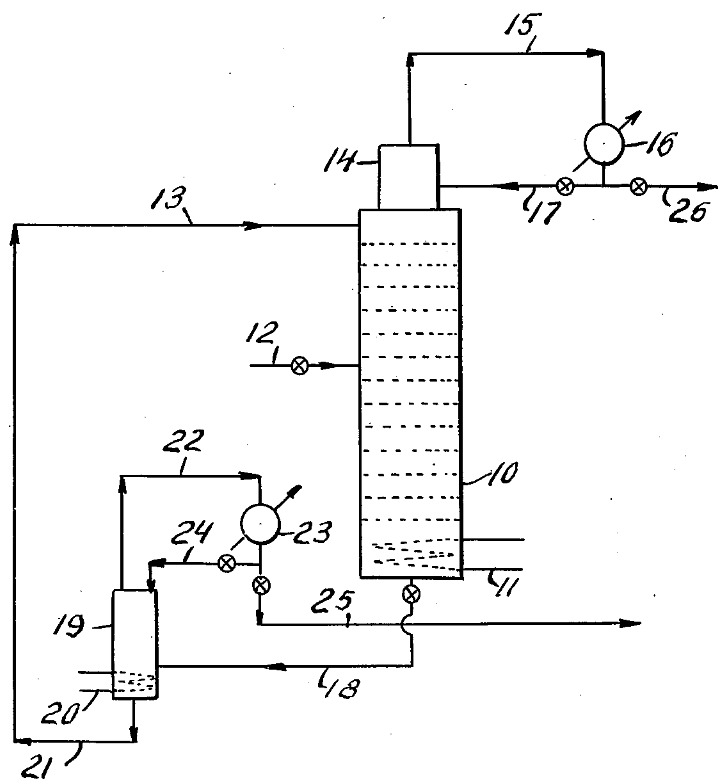
JOHN W. TETER
EDWIN W. SHAND
STEPHEN J. WAYO
INVENTORS
BY Pennie, Edmonds, Morton & Barrows
ATTORNEYS Patented Mar. 4, 1952

2,588,063

UNITED STATES PATENT OFFICE 2,588,063

SEPARATION OF PROPENE AND PROPANE BY EXTRACTIVE DISTILLATION

Stephen J. Wayo, Whiting, Ind., and John W. Teter, Chicago, and Edwin W. Shand, Homewood, Ill., assignors to Sinclair Refining Company, New York, N. Y., a corporation of Maine Application September 30, 1947, Serial No. 776,942

1 Claim. (Cl. 202—39.5)

1

This invention relates to the separation of mixtures of hydrocarbon types of narrow boiling range by selective extraction. More particularly, this invention relates to the separation of such mixtures of hydrocarbon components by means of distillation of the hydrocarbon stock in the presence of a relatively less volatile multi-component solvent containing an aliphatic amide and an aliphatic nitrile with removal of a vapor fraction enriched in the hydrocarbon component less soluble in solvent and the removal of a liquid fraction comprising solvent and enriched in the more soluble hydrocarbon component.

Mixtures of hydrocarbon components having a narrow range of boiling points present obvious difficulties in physical separation. Since the composition of the vapor phase and the composition of the liquid phase under conditions of vapor-liquid equilibrium are substantially the same, separation by means of ordinary fractional distillation is impracticable, if indeed it is possible at all. Where the hydrocarbon components, however, possess type differences in structure or degree of saturation, a shift in the relative volatility and hence the vapor composition may be effected by the admixture of a selected mutual solvent forming non-ideal solutions with the hydrocarbon components. This shift in the relative volatility of the hydrocarbon components from a value approximating unity reflects the varying degree of deviation of the system, hydrocarbon-solvent, from the laws of ideal solution. Where the mutual solvent is relatively non-volatile in comparison with the hydrocarbon mixture, the shift or spread in the relative volatility of the hydrocarbon components makes possible a vapor-liquid phase separation of the mixture.

This separation takes the form of a distillation process carried out in the presence of the relatively less volatile added substance or selective solvent, where the hydrocarbon components show positive deviation from the laws of ideal solution and the vapor fraction recovered is enriched in the component showing less deviation and the liquid fraction or bottoms is the relatively non-volatile solvent enriched in the component showing the greater deviation. Such a distillation process may be conducted as a simple batch process or as a continuous fractional process. For practical reasons, the process is ordinarily conducted as a continuous process.

The crucial problem in the effectiveness of such a process of distillation hinges upon the proper selection of the selective solvent. The choice of solvent is important primarily with regard to its

2 selectivity respecting the hydrocarbon types to be separated. In a continuous process high selectivity of solvent affords greater enrichment per tray of conventional tower and at the same time results in a reduced solvent circulation requirement and lower separation costs. The capacity of the solvent for the hydrocarbon components, that is, the measure of mutual solubility, however, must be balanced against selectivity, for selectivity generally improves with reduced capacity for at least one of the non-solvent components. On the other hand, reduced capacity results in higher solvent circulation requirements and may result in phase difficulties due to the separation of multiple liquid phases. The volatility of the solvent relative to that of the hydrocarbon components is an important factor in solvent selection, for enrichment per tray or stage in the process improves with the spread in volatility between solvent and hydrocarbon components. In addition, the relative non-volatility of the solvent is important in permitting solvent recovery by simple stripping. Separability is likewise favored by the absence of chemical reaction and azeotrope formation with either or both hydrocarbon components. Consequently, the choice of an appropriate solvent or mixture of solvents is complicated by the necessity of balancing a number of interrelated and somewhat antagonistic characteristics, but represents the prime factor in commercial practicability.

We have determined that mixed aliphatic amidealiphatic nitrile solvents possess in desirable relationship qualities marking their utility as selective solvents in the distillation of closely boiling hydrocarbon types, e. g., olefins and paraffins. The amides which are useful in the mixed solvents of this invention are the lower aliphatic amides of up to four carbon atoms in the chain, particularly acetamide, propionamide, and the butyramides. These amides are solids at room temperatures, but as used in multicomponent admixture with lower aliphatic nitriles form liquid solvents. Since the lower amides boil at temperatures above 200° C. and acetonitrile, the lowest member of the nitrile series, has a boiling point of 81.6° C., it is apparent that the mixed solvents posses a desirable degree of non-volatility relative to the light hydrocarbon mixtures which are the subject of commericial separation processes. The nitriles which are useful in admixture with amides are the lower aliphatic nitriles and chloronitriles of up to four carbon atoms in the chain. We have found that multi-component solvents containing an aliphatic amide and one or more nitriles or chloronitriles display superior selectivity in the concentration of olefins in the solvent phase in a vapor-liquid phase separation of a closely boiling hydrocarbon mixture comprising olefins and paraffins. The high selectivity of these solvents compared to the solvents of present use results in increased enrichment per tray in continuous fractionation and, correlatively, in lower solvent circulation requirements and lower separation costs. Surprisingly, the selectivity of the mixed solvents is in general higher than the selectivity of the individual components, and indeed the selectivity of amides alone is too low to be of practical interest.

This invention comprehends a process of selective extraction utilizing a mixed amide-nitrile solvent to shift the relative volatility of the components of a mixture of hydrocarbon types, e. g., olefins and paraffins, so that under an approximation of equilibrium conditions, the vapor-liquid compositions are shifted sufficiently to enable effective separation of hydrocarbon components in the course of a continuous process of phase separation.

A flow diagram for a process utilizing this principle and the solvents of this invention is exemplified in the drawing. The hydrocarbon feed enters a rectification tower 10 through line 12. Solvent is introduced near the top of the tower through line 13 and descends through the tower with the upper part of the tower serving as an absorber section and the lower portion of the tower serving as a stripping section. Heat may be applied to the bottom of the tower as by steam coil 11. The tower 10 contains a number of trays or bubble cap plates or is packed to a height corresponding to a number of theoretical plates calculated as is well-known in the art; e. g. the McCabe-Thiele method, corrected by an empirically determined plate efficiency figure. The vapor composition increases in the hydrocarbon component showing the least deviation from the ideal solution laws; e. g., the paraffin, from plate to plate upward through the tower, and correspondingly the liquid composition on the plates increases downward through the tower in the hydrocarbon component displaying the greatest deviation from the laws of ideal solution; e. g., the olefin. The vapor products which are removed overhead through line 15 are accordingly enriched in the paraffinic hydrocarbon component. The vapor product is condensed in condenser 16 from which reflux may be returned to the tower top through line 17. In order to remove entrained solvent, a partial condenser or dephlegmator 14 may be positioned at the top of the tower. The bottoms comprising solvent and the olefinic hydrocarbon component are withdrawn through line 18 and introduced into a stripping drum 19, to which heat is supplied, as through steam coil 20. In the stripping drum, a separation is effected between solvent which is withdrawn through line 21 and returned to the process and hydrocarbon which passes overhead through line 22, through condenser 23 and line 25. Reflux may be returned to the drum through line 24. Such design factors as the number of plates in the tower, the reflux ratio and the solvent concentration are determined for the process by methods well-known to the art and vary with the rate and character of the feed and with the particular solvent selected.

We have discovered that the relative solubility in the solvent of the hydrocarbon types to be separated presents a reliable qualitative index of solvent selectivity as regards the process of this invention. Since the solvent is relatively non-volatile under the conditions of approximate vapor-liquid equilibria, the concentration of the vapor phase in the two binary systems, paraffin-solvent and olefin-solvent, may be considered substantially all hydrocarbon. And since the binary system, paraffin-olefin, approaches ideality, the relative volatility of the ternary system, paraffin-olefin-solvent, may be conveniently regarded as the ratio of the mol fractions of olefin and paraffin dissolved by solvent. Accordingly, the ease of separation with various solvents and with various solvents under different conditions of temperature, pressure, and solvent concentration may be conveniently estimated by means of solubility determination on the binary hydrocarbon-solvent mixtures.

The manner of determining the solubility of hydrocarbons in multi-component amide-nitrile solvents will be illustrated in the following examples, and the resulting data utilizing propane and propylene as typical hydrocarbon components are set forth in Table A. The solvents and methods described, however, are exemplary of the principle and accomplishment of this invention and are in no way intended to be exclusive.

EXAMPLE I

The solubility of propane and propylene at their vapor pressures at room temperature (where necessary to maintain the solvent in the liquid state higher temperatures are employed) in various solvents is measured. A Jergusen gauge (capacity 200 cc.) is evacuated and filled with the gas by allowing liquid propane or propylene to expand into it at room temperature (80–84° F.). The pressure is read and a measured volume of solvent (25 cc.) is injected into the gauge by applying a pressure of nitrogen in excess of the gas pressure to a column of mercury which backs up the solvent. The gas and solvent are agitated until no further drop in pressure is noted. The volume and pressure are read. Nitrogen pressure is again applied until the pressure comes to and remains constant at the original pressure of the gas. The shrinkage in volume from the original volume is the volume of gas undissolved.

EXAMPLE II

A vapor-liquid equilibrium cell adapted for contacting in either the vapor or liquid phase over a range of pressures from 0 to 1000 p. s. i. a. and a temperature range up to 300° C. is utilized. To check the reproducibility of the results obtained by the method of Example I, the solubility of propane and propylene in a group of mixed amide-nitrile solvents at 95 p. s. i. g. and 80° F. is measured. The cell consists of a heavy-wall cylindrical carbon steel vessel of approximately 500 cc. internal volume, containing a reciprocating basket-type stirrer operated by an external magnetic system, and a thermowell. A bottom connecting tube leads to a calibrated system for adding or withdrawing known amounts of liquid. A top connecting tube provides a connection to which may be attached a pressure gauge or other pressure measuring devices, and a connection where vapor may be admitted or withdrawn. The whole is contained within a thermostatic bath. Provisions are made for admitting or taking samples at either connection. In operation, the cell is evacuated and the hydrocarbon vapor is admitted through the top connecting tube from a metering vessel maintained at 100±2° F. A measured quantity of solvent; e. g. 25 cc. is admitted through the bottom connecting tube, and the system is agitated until equilibrium is established. The pressure drop is noted, and the system is restored to the original pressure with nitrogen.

*Table A*

| Solvent | Mol Fraction of Solvent in the solvent-propylene phase, per cent | Mol Fraction of Solvent in the solvent-propane phase, per cent | Mol Fraction Ratio: Propylene/Propane |
|---|---|---|---|
| Furfural—4 weight per cent Water | 84.8 | 87.6 | 1.23 |
| Acetamide, 64%—Water, 36% | 98.37 | 98.49 | 1.08 |
| Acetonitrile | 79.4 | 86.9 | 1.57 |
| Propionitrile | 69.6 | 72.9 | 1.12 |
| 11.4% Acetamide, 88.6% Acetonitrile | 84.0 | 89.7 | 1.55 |
| 15.95% Acetamide, 84.05% Acetonitrile | 82.6 | 89.9 | 1.72 |
| 11.4% Propionamide, 88.6% Acetonitrile | 80.7 | 89.1 | 1.77 |
| 27.8% Propionamide, 72.2% Acetonitrile | 82.2 | 89.2 | 1.65 |
| 11.5% Propionamide, 88.5% Propionitrile | 70.4 | 78.7 | 1.39 |
| 20.7% Propionamide, 79.3% Propionitrile | 72.7 | 80.0 | 1.37 |

We claim:

The method of separating propene and propane which comprises extractively distilling the propene-propane mixture with a multicomponent solvent comprising about 11.4 to about 27.8% by volume of a first component selected from the group consisting of acetamide and propionamide and about 88.6 to about 72.2% by volume of a second component from the group consisting of acetonitrile and propionitrile, removing a vapor fraction relatively rich in propane and a liquid fraction comprising solvent and relatively rich in propene.

STEPHEN J. WAYO.
JOHN W. TETER.
EDWIN W. SHAND.

REFERENCES CITED

The following references are of record in the file of this patent:

UNITED STATES PATENTS

| Number | Name | Date |
|---|---|---|
| 2,339,576 | Luten | Jan. 18, 1944 |
| 2,366,360 | Semon | Jan. 2, 1945 |
| 2,366,361 | Semon | Jan. 2, 1945 |
| 2,379,696 | Evans | July 3, 1945 |
| 2,386,927 | Boyd | Oct. 16, 1945 |
| 2,441,827 | McKinnis | May 18, 1948 |